United States Patent [19]

Wallis

[11] Patent Number: 4,741,518
[45] Date of Patent: May 3, 1988

[54] SELF CONTAINED GAS SPRING INTERCHANGEABLE WITH COIL SPRING

[76] Inventor: Bernard J. Wallis, 2215 Dacosta, Dearborn, Mich. 48128

[21] Appl. No.: 900,452

[22] Filed: Aug. 26, 1986

[51] Int. Cl.$^4$ .................. F01B 31/00; F16F 13/00; F16F 5/00

[52] U.S. Cl. ........................ 267/75; 92/164; 267/119; 267/130

[58] Field of Search ............... 267/119, 64.11, 64.28, 267/130, 136, 137, 124, 75; 92/164, 128, 117 R, 169; 188/322.19, 322.21

[56] References Cited

U.S. PATENT DOCUMENTS

| | | | |
|---|---|---|---|
| 2,694,567 | 11/1954 | Hoenig | 267/119 |
| 3,101,194 | 8/1963 | Hennells | 267/119 |
| 3,136,230 | 6/1964 | Buckley | 92/128 |
| 3,300,202 | 1/1967 | Vinton | 267/64.11 X |
| 4,005,763 | 2/1977 | Wallis | 267/119 X |
| 4,550,899 | 11/1985 | Holley | 267/64.28 X |

FOREIGN PATENT DOCUMENTS

| | | | |
|---|---|---|---|
| 1231201 | 5/1971 | United Kingdom | 92/164 |
| 0298488 | 3/1971 | U.S.S.R. | 92/128 |

Primary Examiner—Andres Kashnikow
Assistant Examiner—Robert J. Oberleitner
Attorney, Agent, or Firm—Barnes, Kisselle, Raisch, Choate, Whittemore & Hulbert

[57] ABSTRACT

A self contained gas spring interchangeable with a coil spring comprising a cylindrical body having a constant diameter external cylindrical surface, the cylindrical body having open ends and a piston within said cylindrical body and having one end projecting through one of the openings of the cylindrical body. The piston and the cylindrical body have interengaging flanges that limit the outward movement of the piston relative to the cylindrical body. A plug is positioned in the other end of the cylindrical body to close the opening of the cylindrical body. A charging valve is positioned in the plug for charging the interior of the gas spring. The piston has a hollow inner end with an inner surface tapering outwardly and axially toward the plug. The plug has a generally complementary surface such that the piston can move downwardly about a portion of the plug thereby substantially reducing the height of the gas spring.

14 Claims, 1 Drawing Sheet

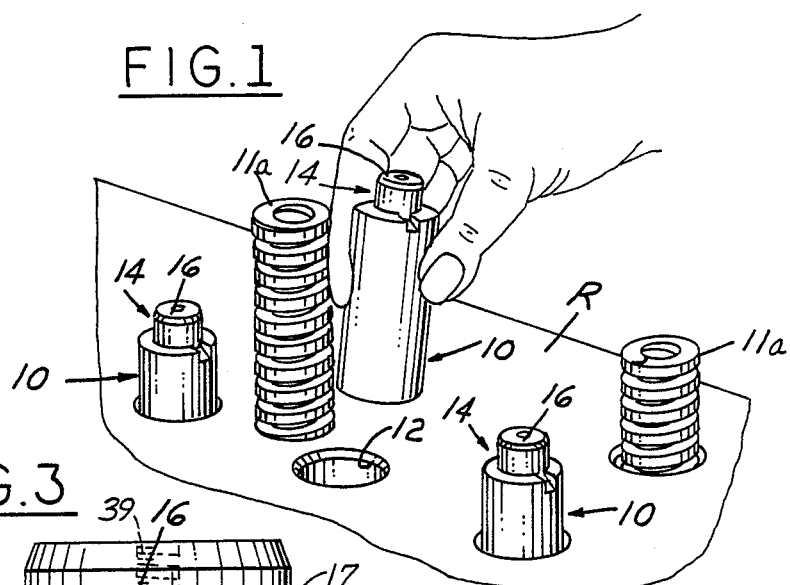
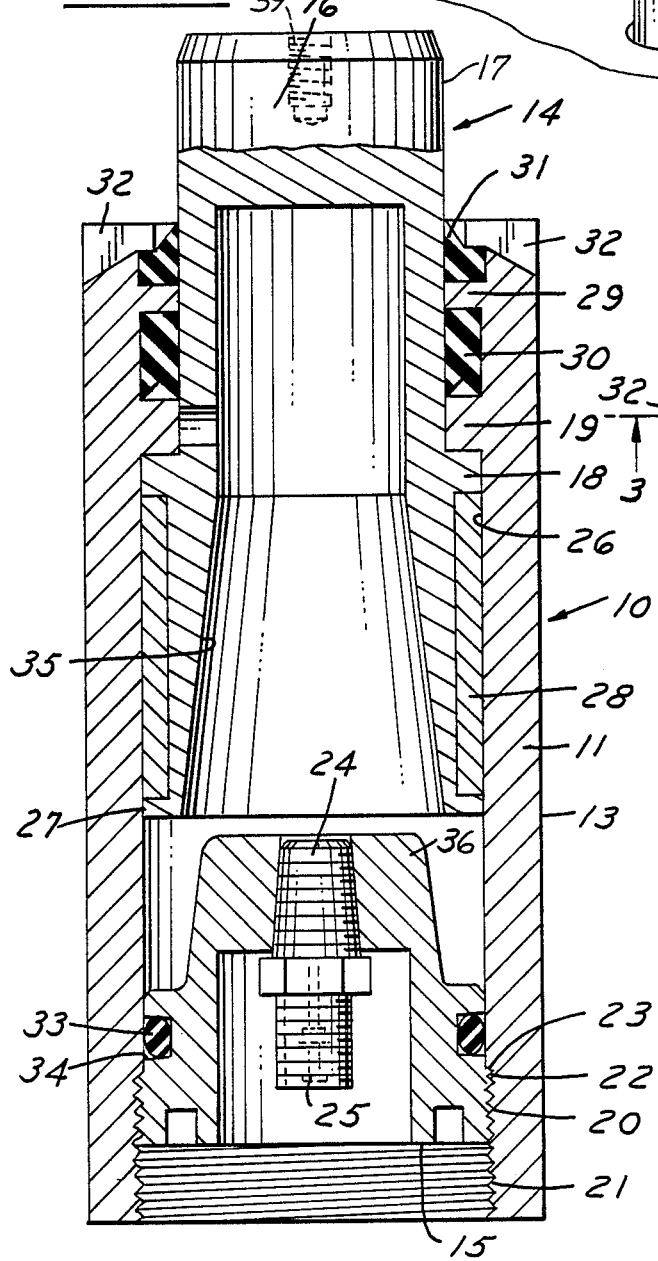
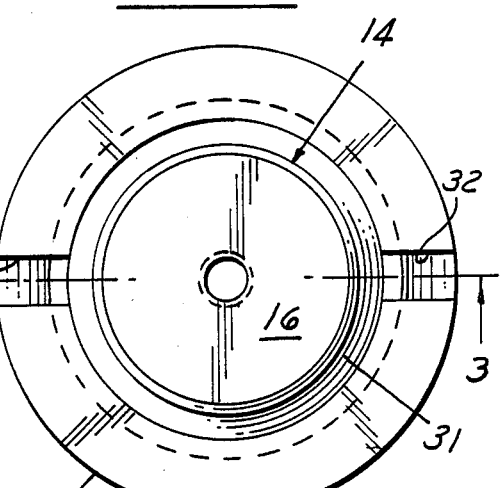
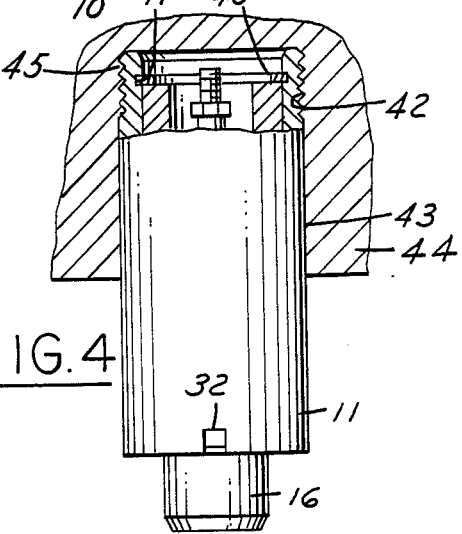

SELF CONTAINED GAS SPRING INTERCHANGEABLE WITH COIL SPRING

This invention relates to gas springs.

BACKGROUND AND SUMMARY OF THE INVENTION

In presses and dies it has been common to utilize coil metal springs that fit in cylindrical pockets in a die in order to absorb the force of various operations such as metal stamping operations. It has also been common to design rams such that they incorporate gas springs which are either associated with a manifold or self contained.

Among the objectives of the present invention are to provide a small gas spring which is interchangeable with a coil springs; which can be readily substituted for coil springs without any change in the ram; which is compact and effective for the intended purpose.

In accordance with the invention, the self contained gas spring interchangeable with coil spring comprises a cylindrical body having a constant diameter external cylindrical surface, the cylindrical body having open ends and a piston within said cylindrical body and having one end projecting through one of the openings of the cylindrical body. The piston and the cylindrical body have interengaging flanges that limit the outward movement of the piston relative to the cylindrical body. A plug is positioned in the other end of the cylindrical body to close the opening of the cylindrical body. A charging valve is positioned in the plug for charging the interior of the gas spring. The piston has a hollow inner end with an inner surface tapering outwardly and axially toward the plug. The plug has a generally complementary surface such that the piston can move downwardly about a portion of the plug thereby substantially reducing the height of the gas spring.

DESCRIPTION OF THE DRAWINGS

FIG. 1 is a partly diagrammatic perspective view showing the interchangeability of gas spring embodying the invention for coil spring.

FIG. 2 is a plan view of the gas spring.

FIG. 3 is a sectional view taken along the line 3—3 in FIG. 2.

FIG. 4 is a fragmentary sectional view of a modified form of gas spring.

DESCRIPTION

Referring to FIG. 1, the gas springs 10 embodying the invention are adapted to be interchangeable with coil spring 11a that fit in pockets 12 in the portion of the die R or the like of a press such as is used in metal stamping. The gas spring 10 comprises a metal cylindrical body 11 having a smooth external cylindrical surface 13 such that the gas spring 10 may be merely dropped in the pocket 12. The cylindrical body 11 has a passage therethrough with both ends open prior to insertion of a metal piston 14 and a plug 15. The piston 14 includes a flat closed end 16 and an upper external cylindrical surface 17 that extends to an annular flange 18 that extends radially outwardly. The upper cylindrical surface 17 is the only part of the gas spring 10 that needs to be polished. The flange 18 engages an internal flange 19 that extends radially inwardly from the cylindrical body 11 to limit the outward movement of the piston 14. The portion of the piston below the closed end 16 is hollow to provide substantial area for pressurized gas within the compact confines of the piston and cylinder. The plug 15 has external threads 20 that engage internal threads 21 on the lower end of the body 11 so that the plug can be placed in position and will remain in position. The plug includes a shoulder 22 that engages a complementary shoulder 23 on the wall 11. The plug further includes a fitting 24 that is threaded into the plug and supports a one-way charging valve 25 such as a Schraeder type valve, similar to a tire valve.

The portion of the body 11 below the flange 19 has an inner surface 26 having a constant diameter. The piston includes a second flange 27 at its lower end that supports an annular bearing 28. The cylinder body 11 includes a second annular flange 29 that cooperates with flange 19 to retain an annular seal 30. Finally, the cylinder body supports an annular wiper 31 at its upper end. The upper end of the body 11 includes downwardly and outwardly extending slots 32 that serve to permit oil and debris to flow outwardly thereby minimizing possible contamination of the seal between the piston and the cylinder body. The plug 15 also supports an O-ring 33 in an annular groove 34 that seals against the inner surface of the cylindrical body. A top wall of piston 14 is provided with a tapped hole 39 for utilizing a threaded tool to lift a gas spring from an opening in a lower die. Slots 32 are also used for engagement of a tool for engaging the cylinder to engage outer threads 21 on the cylinder with complementary threads on the side wall of a pocket in an upper die when the cylinder must be inserted upwardly.

The lower portion of the portion 35 of the inner surface of the piston is tapered downwardly and outwardly and the upper portion 36 of the plug is tapered upwardly and inwardly such that the piston will telescope over the end of the plug as the piston is moved downwardly by a load. This contributes to the reduction of the overall size of the cylinder.

In the form of gas spring shown in FIG. 4, the plug 36 is retained in position by a C-shaped spring washer 40 which snaps into a groove 41 on the inner surface of body 11. In addition, threads 42 are provided on the end remote from the free end of piston 16 so that the gas spring can be mounted in inverted position in an opening 43 on an upper moving part 44 of a press having threads 45 for receiving the threads 42.

It can thus be seen that there has been provided a small gas spring which is interchangeable with coil springs; which can be readily substituted for coil springs without any change in the ram; which is compact and effective for the intended purpose.

I claim:

1. A self contained gas spring interchangeable with a coil spring comprising
   a cylindrical body having a substantially constant diameter external cylindrical surface,
   said cylindrical body having open ends and an inner surface,
   a one-piece piston having an end and an integral side wall having an outer surface,
   said piston being inserted in said cylindrical body and having one closed end projecting through one of the open ends of the cylindrical body,
   said piston having an integral outwardly extending radial first flange on the external surface thereof,
   said cylindrical body having an integral inwardly extending first flange on the inner surface thereof adapted to interengage the flange on said piston to limit the outward movement of said piston relative to said cylindrical body, a plug positioned in the other end of the cylindrical body to close said other end the cylindrical body, an axial charging valve positioned in the plug for charging the interior of the gas spring, said piston having a hollow inner end with an inner surface having a lower portion of the inner surface thereof tapering outwardly and axially toward said plug, the plug having a central portion projecting axially toward said piston and having a generally complementary surface such that the side wall of the piston can move downwardly about the central portion of the plug thereby substantially reducing the height of the gas spring, said plug having an axially outwardly extending opening, said one-way charging valve supported in said plug entirely within the confines of said opening in said plug, said gas spring being capable of being inserted in a cylindrical opening of a base member such that it is interchangeable with a coil spring in the cylindrical opening.

2. The gas spring set forth in claim 1 including a second flange on said piston and a bearing between said second flange and said first flange on said piston.

3. The gas spring set forth in claim 1 including circumferentially spaced grooves in the end of said cylindrical body adjacent said one end of said piston extending axially toward said plug and radially outwardly through the cylindrical body for passage of oil and debris and for engagement of a tool.

4. The gas spring set forth in claim 1 including a second flange on said cylindrical body and a seal interposed between said second flange and said first flange on said cylindrical body.

5. The gas spring set forth in claim 1 wherein said plug has external threads engaging internal threads on said cylindrical body.

6. The gas spring set forth in claim 1 wherein said plug and cylindrical body have interengaging surfaces limiting the movement of said plug axially inwardly of said body.

7. The gas spring set forth in claim 1 wherein said inner surface of said cylindrical body has an annular groove and a C-shaped spring washer in said groove retaining said plug in said cylindrical body.

8. The gas spring set forth in claim 1 including a threaded recess in said other end of said cylindrical body remote from the piston for receiving a threaded tool to facilitate lifting of said gas spring out of an opening into which it has been placed.

9. The gas spring set forth in claim 1 including threads on the outer surface of the cylindrical body adjacent the other opening of said body for engagement with threads on the side wall of said base member in which said gas spring is to be positioned.

10. A self contained gas spring interchangeable with a coil spring comprising a cylindrical body having a substantially constant diameter external cylindrical surface, said cylindrical body having open ends and an inner surface, a one-piece piston having an end and an integral side wall having another surface, said piston being inserted in said cylindrical body and having one closed end projecting through one of the openings of the cylindrical body, a plug positioned in the other end of the cylindrical body to close the opening of the cylindrical body, an axial charging valve positioned in the plug for charging the interior of the gas spring, said piston having a hollow inner end with an inner surface having a lower portion of the inner surface thereof tapering outwardly and axially toward said plug, the plug having a central portion projecting axially toward said piston and having a generally complementary surface such that side wall of the the piston can move downwardly about the central portion of the plug thereby substantially reducing the height of the gas spring, said plug having an axially outwardly extending opening, said one-way charging valve supported in said plug entirely within the confines of said opening in said plug, said gas spring being capable of being inserted in a cylindrical opening of a base member such that it is interchangeable with a coil spring in said opening, said gas spring including a threaded recess in the outer end of said piston for receiving a threaded tool to facilitate lifting of the gas spring out of the opening into which it has been placed, said gas spring including circumferentially spaced grooves in the end of said cylindrical body adjacent said one end of said piston extending axially toward said plug and radially outwardly for passage of oil and debris and for engagement of the tool, said piston having an integral outwardly extending radial flange on the external surface thereof, said cylindrical body having an integral inwardly extending first flange on the inner surface thereof adapted to interengage the flange on said piston to limit the outward movement of said piston relative to said cylindrical body, a second flange on said piston and a bearing between said second flange and said first flange on said piston, a second flange on said cylindrical body and a seal interposed between said second flange and said first flange on said cylindrical body.

11. The gas spring set forth in claim 10 wherein said plug has external threads engaging internal threads on said cylindrical body.

12. The gas spring set forth in claim 11 wherein said inner surface of said ring cylindrical body has an annular groove and a C-shaped spring washer in said groove retaining said plug in said cylinder.

13. The gas spring set forth in claim 10 wherein said plug and cylindrical body have interengaging surfaces limiting the movement of said plug axially inwardly of said body.

14. The gas spring set forth in claim 10 including threads on the outer surface of the cylindrical body adjacent said other open end of said body for engagement with threads on the side wall of an opening of a base member in which said gas spring is to be positioned.

* * * * *